United States Patent
Samuel et al.

(10) Patent No.: US 9,052,439 B2
(45) Date of Patent: *Jun. 9, 2015

(54) METHOD FOR MAKING UV-ABSORBING OPHTHALMIC LENSES

(75) Inventors: Newton T. Samuel, Suwanee, GA (US); John Dallas Pruitt, Suwanee, GA (US); Daqing Wu, Suwanee, GA (US); Selma Kuyu, Duluth, GA (US)

(73) Assignee: Novartis AG, Basel (CH)

( * ) Notice: Subject to any disclaimer, the term of this patent is extended or adjusted under 35 U.S.C. 154(b) by 961 days.

This patent is subject to a terminal disclaimer.

(21) Appl. No.: 13/186,616

(22) Filed: Jul. 20, 2011

(65) Prior Publication Data

US 2012/0023869 A1 Feb. 2, 2012

Related U.S. Application Data

(60) Provisional application No. 61/369,107, filed on Jul. 30, 2010.

(51) Int. Cl.
*G02B 1/04* (2006.01)
*G02C 7/04* (2006.01)
*B29D 11/00* (2006.01)

(52) U.S. Cl.
CPC *G02B 1/043* (2013.01); *G02C 7/04* (2013.01); *B29D 11/00048* (2013.01); *B29D 11/00038* (2013.01); *G02C 7/049* (2013.01)

(58) Field of Classification Search
CPC ............. G02B 1/043; B29D 11/00048; B29D 11/00038; G02C 7/04; G02C 7/049
USPC .......................................................... 523/106
See application file for complete search history.

(56) References Cited

U.S. PATENT DOCUMENTS

| | | |
|---|---|---|
| 3,162,676 A | 12/1964 | Goldberg |
| 3,299,173 A | 1/1967 | Roselli |
| 3,399,173 A | 8/1968 | Heller |
| 3,408,429 A | 10/1968 | Wichterle |
| 3,974,131 A | 8/1976 | Puskas |
| 4,136,250 A | 1/1979 | Mueller |
| 4,153,641 A | 5/1979 | Deichert |
| 4,182,822 A | 1/1980 | Chang |
| 4,189,546 A | 2/1980 | Deichert |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,276,402 A | 6/1981 | Chromecek |
| 4,304,895 A | 12/1981 | Loshaek |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,444,711 A | 4/1984 | Schad |
| 4,460,534 A | 7/1984 | Boehm |
| 4,485,236 A | 11/1984 | Rasmussen |
| 4,486,877 A | 12/1984 | Turner |
| 4,528,311 A | 7/1985 | Beard |
| 4,543,398 A | 9/1985 | Bany |
| 4,605,712 A | 8/1986 | Mueller |
| 4,612,358 A | 9/1986 | Besecke |
| 4,661,575 A | 4/1987 | Tom |
| 4,684,538 A | 8/1987 | Klemarcayk |
| 4,703,097 A | 10/1987 | Wingler |
| 4,716,234 A | 12/1987 | Dunks |
| 4,833,218 A | 5/1989 | Lee |
| 4,837,289 A | 6/1989 | Mueller |
| 4,954,586 A | 9/1990 | Toyoshima |
| 4,954,587 A | 9/1990 | Mueller |
| RE33,477 E | 12/1990 | Loshaek |
| 4,985,559 A | 1/1991 | Goldberg |
| 5,010,141 A | 4/1991 | Mueller |
| 5,034,461 A | 7/1991 | Lai |
| 5,039,761 A | 8/1991 | Ono |
| 5,070,170 A | 12/1991 | Robertson |
| 5,079,319 A | 1/1992 | Mueller |
| 5,194,544 A | 3/1993 | Goldberg |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |

(Continued)

FOREIGN PATENT DOCUMENTS

WO 8903386 A1 4/1989

OTHER PUBLICATIONS

Author: John C. Crawford Title of Article: 2(2-Hydroxyphenyl)2H-benzotriazole ultraviolet stabilizers Rohm and Haas Company Research Laboratories, Spring House, PA Published: 1999 Elsevier Science Ltd.—Progress in Polymer Science 24 (1999) pp. 7-43.
PCT Written Opinion of the International Searching Authority dated Dec. 7, 2011, International Application No. PCT/US2011/044618, International filing date Jul. 20, 2011.
PCT International Search Report dated Dec. 7, 2011, International Application No. PCT/US2011/044618, International filing date Jul. 20, 2011.
Winterton, et al., (The Cornea: Transactions of the World Congress on the Cornea 111, H.D. Cavanagh Ed., Raven Press: New York 1988, pp. 273-280).

*Primary Examiner* — Michael Pepitone
(74) *Attorney, Agent, or Firm* — Jian Zhou

(57) ABSTRACT

Described herein is a cost-effective and time-efficient method for making UV-absorbing contact lenses. In contrast to the conventional method for making UV-absorbing contact lenses which involves copolymerizing a lens forming composition including a UV-absorbing vinylic monomer, a method of the invention involves covalent attachment of a UV-absorbing compound having a second reactive functional group to a preformed contact lens having a first reactive functional group therein and/or thereon.

11 Claims, No Drawings

(56) References Cited

U.S. PATENT DOCUMENTS

| | | |
|---|---|---|
| 5,486,579 A | 1/1996 | Lai |
| 5,508,317 A | 4/1996 | Müller |
| 5,583,463 A | 12/1996 | Merritt |
| 5,637,726 A | 6/1997 | Collins |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger |
| 5,962,548 A | 10/1999 | Vanderlaan |
| 5,981,675 A | 11/1999 | Valint, Jr. |
| 6,039,913 A | 3/2000 | Hirt |
| 6,244,707 B1 | 6/2001 | Faubl |
| 6,627,124 B1 | 9/2003 | Herbrechtsmeier |
| 6,762,264 B2 | 7/2004 | Künzler |
| 6,800,225 B1 | 10/2004 | Hagmann |
| 7,091,283 B2 | 8/2006 | Müller |
| 7,238,750 B2 | 7/2007 | Müller |
| 7,268,189 B2 | 9/2007 | Müller |
| 7,384,590 B2 | 6/2008 | Kelly |
| 7,387,759 B2 | 6/2008 | Kelly |
| 7,521,519 B1 | 4/2009 | Hirt |
| 8,431,624 B2 * | 4/2013 | Domschke et al. ........... 523/107 |
| 2001/0025198 A1 | 9/2001 | Faubl |
| 2006/0197067 A1* | 9/2006 | Xia et al. ...................... 252/582 |
| 2007/0250014 A1 | 10/2007 | Utterberg |
| 2007/0255014 A1 | 11/2007 | Salamone |
| 2008/0015315 A1 | 1/2008 | Chang |
| 2008/0143003 A1 | 6/2008 | Phelan |
| 2008/0143958 A1 | 6/2008 | Medina |
| 2008/0231798 A1 | 9/2008 | Zhou |
| 2008/0234457 A1 | 9/2008 | Zhou |
| 2010/0296049 A1 | 11/2010 | Justynska |
| 2010/0298446 A1 | 11/2010 | Chang |

* cited by examiner

METHOD FOR MAKING UV-ABSORBING OPHTHALMIC LENSES

This application claims the benefit under 35 U.S.C. §119 (e) of U.S. provisional application Ser. No. 61/369,107, filed on Jul. 30, 2010, incorporated herein by reference in its entirety.

This invention is related to a method for making ophthalmic lenses (including contact lenses and intraocular lenses) capable of blocking ultra-violet ("UV") radiation and thereby protecting eyes to some extent from damages caused by UV radiation. This invention also provides UV-absorbing ophthalmic lenses made according to a method of the invention.

BACKGROUND

In general, contact lenses are produced in mass by a so-called cast-molding process, which involves thermo- or UV-induced free-radical polymerization of a lens-forming composition including vinylic monomers and/or vinylic macromers in molds. UV-induced polymerization process is generally preferred because its processing cycle is shorter than the thermo-induced polymerization process. In certain applications, it is desirable to incorporate UV absorbers into the ophthalmic lens. One approach is to copolymerize a polymerizable UV absorber with other lens-forming vinylic monomers and/or macromer so that the UV absorber is covalently attached to the copolymer. Copolymerizable benzotriazole, benzophenone and triazine UV absorbers, which include an ethylenically unsaturated group covalently linked to their UV-absorbing moieties, are known and have been used previously. However, there are several disadvantages associated with use of a known polymerizable UV-absorber. First, the efficiency of incorporation of the UV-absorber in lenses may not be certain. Second, a UV-absorber present in a lens forming composition can reduce the amount of UV radiation available to initiate polymerization and may even lower the efficiency of covalent incorporation of the UV absorber into resultant lenses. Unreacted UV absorbers generally must be removed from the lenses in one or more extraction processes. Third, a UV-absorber may result in ineffective or uneven photo-polymerization of the lens forming composition.

Therefore, there still exists a need for a cost-effective method for making UV-absorbing contact lenses.

SUMMARY

Described herein are methods useful in the production of UV-blocking (or UV-absorbing) ophthalmic lenses. A method of the invention comprises the steps of: obtaining an ophthalmic lens the polymer matrix of which comprises reactive vinylic monomer units each having a first reactive functional group; and covalently attaching UV-absorbing moieties to the polymer matrix through the first reactive functional groups of the reactive vinylic monomer units, by contacting the ophthalmic lens with a solution containing a UV-absorbing compound having a UV-absorbing moieties and a second reactive functional group coreactive with the first reactive functional group to form a covalent linkage, wherein one of the first and second reactive functional groups is an azlactone group, an isocyanate group, an epoxy group or an aziridine group, while the other group is an amino group (primary or secondary amino group), carboxylic acid or a thiol group.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present methods are disclosed and described, it is to be understood that the aspects described below are not limited to specific compounds, steps, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"Optional" or "optionally" means that the subsequently described event or circumstance can or cannot occur, and that the description includes instances where the event or circumstance occurs and instances where it does not.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

An "ophthalmic lens", as used herein, refers to a contact lens (hard or soft) or an intraocular lens.

A "contact Lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

A "vinylic monomer" refers to a low molecular weight compound that has one sole ethylenically-unsaturated group. Low molecular weight typically means average molecular weights less than 700 Daltons.

A "vinylic macromer" refers to a medium and high molecular weight compound which comprises one or more ethylenically unsaturated groups. Medium and high molecular weight typically means average molecular weights greater than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

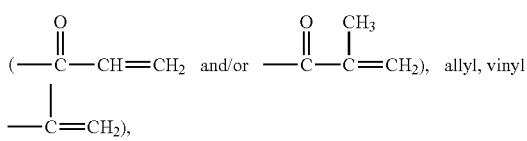

styrenyl, or other C=C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used herein "polysiloxane" refers to a compound or a segment including at least one divalent radical of

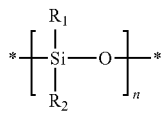

in which $R_1$ and $R_2$ are independently a monovalent $C_1$-$C_{10}$ alkyl, a monovalent $C_1$-$C_{10}$ aminoalkyl, a monovalent of $C_1$-$C_{10}$ hydroxyalkyl, $C_1$-$C_{10}$ ether, $C_1$-$C_{10}$ fluoroalkyl, $C_1$-$C_{10}$ fluoroether or $C_6$-$C_{18}$ aryl radical, -alk-(OCH$_2$CH$_2$)$_m$—OR$_3$, in which alk is $C_1$-$C_6$ alkylene divalent radical, $R_3$ is hydrogen or $C_1$-$C_6$ alkyl, and m is an integer of from 1 to 10; n is an integer of 2 or higher.

The term "amino group" as used herein has the formula —NHR, where R is hydrogen or a $C_1$-$C_{20}$ unsubstituted or substituted, linear or branched alkyl group.

As used herein, the term "azlactone group" refers to a functional group having the formula of

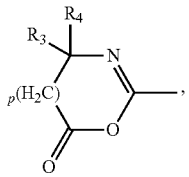

in which p is 0 or 1; $R_3$ and $R_4$ independently can be an alkyl group having 1 to 14 carbon atoms, a cycloalkyl group having 3 to 14 carbon atoms, an aryl group having 5 to 12 ring atoms, an arenyl group having 6 to 26 carbon and 0 to 3 sulfur, nitrogen and/or oxygen atoms, or $R_3$ and $R_4$ taken together with the carbon to which they are joined can form a carbocyclic ring containing 4 to 12 ring atoms.

A "prepolymer" refers to a starting polymer that can be cured (e.g., crosslinked and/or polymerized) actinically or thermally to obtain a crosslinked and/or polymerized polymer having a molecular weight much higher than the starting polymer.

A "silicone-containing prepolymer" refers to a prepolymer which contains silicone.

"Molecular weight" of a polymeric material (including monomeric or macromeric materials), as used herein, refers to the weight-average molecular weight unless otherwise specifically noted or unless testing conditions indicate otherwise.

"Polymer" means a material formed by crosslinking or polymerizing one or more monomers.

The invention is generally directed to a cost-effective and time-efficient method for making UV-absorbing contact lenses. In contrast to the conventional method for making UV-absorbing contact lenses which involves copolymerizing a lens forming composition including a UV-absorbing vinylic monomer, a method of the invention involves covalent attachment of UV-absorbing moieties onto the polymer matrix of a contact lens posterior to the lens curing step. The invention is partly based on the discovery that a relatively-fast coupling reaction between a pair of reactive functional groups, for example, between an azlactone group and an amino or thiol group, between an epoxide group and an amino or thiol group, between an azidirine group and an amino or thiol group, or an isocyanate group and an amino or thiol group, can be used readily to covalently attach a UV-absorbing compound having a second reactive functional group to a contact lens having a first reactive functional group therein and/or thereon.

Coupling reactions between a pair of reactive functional groups are well known reactions under the conditions that are customary for formation of covalent linkages. For example, an amino group —NHR reacts with an azlactone group to form a linkage (—C(O)NH—CR$_3$R$_4$—(CH$_2$)p-C(O)—NR—), with an epoxy or aziridine group to form an amine bond (C—NR) and with an isocyanate group to form a urea linkage (—NR—C(O)—NH—); a thiol group (—SH) reacts with an azlactone group in the presence of a catalyst to form a linkage (—C(O)NH—CR$_3$R$_4$—(CH$_2$)p-C(O)—S—), with an epoxy or aziridine to form a thioether linkage (—S—), and with an isocyanate to form a thiocarbamate linkage (—N—C(O)—S—).

The present invention can provide the following advantages. First, the incorporation of UV-absorbing moieties to the polymer matrix of a contact lens is carried out after curing a lens-forming composition in a mold and thereby can overcome the disadvantages of using a UV-absorbing vinylic monomer described previously in the section "Background." Second, the whole process is based on wet chemistry and thereby no drying of contact lenses is required. Incorporation of a UV-absorbing compound into and/or onto a contact lens according to the invention can be accomplished, e.g., by dipping contact lenses in a solution for a period of time. Such process can be easily implemented in a fully-automated, mass-production environment.

The invention, in one aspect, provides a method of producing a UV-absorbing contact lens, which comprises the steps of: obtaining an ophthalmic lens, preferably a contact lens, including a polymer matrix comprising reactive vinylic monomer units each having a first reactive functional group; and covalently attaching UV-absorbing moieties to the polymer matrix through the first reactive functional groups of the reactive vinylic monomer units, by contacting the contact lens with a solution containing a UV-absorbing compound having a UV-absorbing moiety and a second functional group coreactive with one first reactive functional group to form a covalent linkage, wherein one of the first and second reactive functional groups is an azlactone group, an isocyanate group, an epoxy group, an aziridine group, or combination thereof, while the other group is an amino group (primary or secondary amino group), carboxylic acid group, or a thiol group.

In accordance with the invention, a contact lens can be any contact lens, including soft and hard contact lens. A preferred soft contact lens is a silicone hydrogel contact lens.

A person skilled in the art will know well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810. In cast-molding, a lens formulation typically is dispensed into molds and cured (i.e., polymerized and/or crosslinked) in molds for making contact lenses. For production of preferred silicone hydrogel contact lenses, a lens formulation for cast-molding of contact lenses generally comprises at least one components selected from the group consisting of a silicone-containing vinylic monomer, a silicone-containing vinylic macromer, a hydrophilic vinylic monomer, a hydrophilic vinylic macromer, a hydrophobic vinylic monomer, and combination thereof. A silicone hydrogel contact lens formulation can also comprise other necessary components known to a person skilled in the art. The polymer matrix of a contact lens is formed from polymerizable components in the lens formulation during the cast-molding process. In accordance with the invention, at least one of the polymerizable components (i.e., vinylic monomer(s) and vinylic macromer(s)) in the lens formulation comprises a first reactive functional group selected from the group consisting of amino group, azlactone group, isocyanate group, epoxy group, aziridine group, and combination thereof.

Any suitable silicone-containing vinylic monomers or macromers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsiloxy)methylsilyl)propyloxy)propyl)-2-methyl acrylamide; N-(2-hydroxy-3-(3-(bis(trimethylsilyloxy)methylsilyl)propyloxy)propyl)acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl] acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl] acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy) methylsilane, N-2-methacryloxyethyl-O-(methyl-bis-trimethylsiloxy-3-propyl)silyl carbamate, 3-(trimethylsilyl) propylvinyl carbonate, 3-(vinyloxycarbonylthio)propyl-tris(trimethyl-siloxy)silane, 3-[tris(trimethylsiloxy)silyl] propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth) acrylamide monomers of formula (1) are N-[tris(trimethylsiloxy)silylpropyl]acrylamide, TRIS, N-[2-hydroxy-3-(3-(t-butyldimethylsilyl)propyloxy)propyl] acrylamide.

A class of preferred silicone-containing vinylic monomers or macromers is polysiloxane-containing vinylic monomers or macromers. Examples of such vinylic monomers or macromers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl(meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties). Di and triblock macromers consisting of polydimethylsiloxane and polyalkyleneoxides could also be of utility. For example one might use methacrylate end capped polyethyleneoxide-block-polydimethylsiloxane-block-polyethyleneoxide to enhance oxygen permeability. Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing vinylic macromers is silicon-containing prepolymers comprising hydrophilic segments and hydrophobic segments. Any suitable silicone-containing prepolymers with hydrophilic segments and hydrophobic segments can be used in the invention. Examples of such silicone-containing prepolymers include those described in commonly-owned U.S. Pat. Nos. 6,039,913, 7,091,283, 7,268,189 and 7,238,750, 7,521,519; commonly-owned US patent application publication Nos. US 2008-0015315 A1, US 2008-0143958 A1, US 2008-0143003 A1, US 2008-0234457 A1, US 2008-0231798 A1, and commonly-owned U.S. patent application Nos. 61/180,449 and 61/180,453; all of which are incorporated herein by references in their entireties.

Any suitable hydrophilic vinylic monomers can be used in the invention. Examples of hydrophilic vinylic monomers are, without this being an exhaustive list, hydroxyl-substituted lower alkyl ($C_1$ to $C_3$)(meth)acrylates, hydroxyl-substituted lower alkyl vinyl ethers, $C_1$ to $C_3$ alkyl(meth)acrylamide, di-($C_1$-$C_3$ alkyl)(meth)acrylamide, pyrrolidone derivatives with methylene as polymerizable group, N-vinylpyrrole, N-vinyl-2-pyrrolidone, 2-vinyloxazoline, 2-vinyl-4,4'-dialkyloxazolin-5-one, 2- and 4-vinylpyridine, amino(lower alkyl)—(where the term "amino" also includes quaternary ammonium), mono(lower alkylamino)(lower alkyl) and di(lower alkylamino)(lower alkyl)(meth)acrylates, allyl alcohol, N-vinyl $C_1$ to $C_3$ alkylamide, N-vinyl-N—$C_1$ to $C_3$ alkylamide, $C_1$-$C_4$-alkoxy polyethylene glycol (meth) acrylate having a weight average molecular weight of up to 1500, and the like.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol (meth)acrylate having a weight average molecular weight of up to 1500, N-vinyl formamide, N-vinyl acetamide, N-vinyl isopropylamide, N-vinyl-N-methyl acetamide, allyl alcohol, N-vinyl caprolactam, and mixtures thereof.

Any suitable hydrophobic vinylic monomers can be used in the invention. Examples of preferred hydrophobic vinylic monomers include methyl (meth)acrylate, ethyl (meth)acrylate, propyl (meth)acrylate, isopropyl (meth)acrylate, butyl (meth)acrylate, sec-butyl (meth)acrylate, isobutyl (meth) acrylate, t-butyl (meth)acrylate, cyclohexylacrylate, 2-ethylhexylacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate, silicone-containing vinylic monomers described above, and mixtures thereof. Most preferably, the polymerizable composition comprises a bulky hydrophobic vinylic monomer. Preferred bulky hydrophobic vinylic monomers include without limitation those preferred silicone-containing vinylic monomers described above, t-butyl (meth)acrylate, cyclohexylacrylate, isobornyl methacrylate, a polysiloxane-containing vinylic monomer having 3 to 8 silicone atoms, and combinations thereof.

It must be understood that a lens-forming composition can also comprise various components, such as, for example, a crosslinking agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

In accordance with the invention, the reactive vinylic monomer units, each having a first reactive functional group, of the polymer matrix of a contact lens is derived from a reactive vinylic monomer (i.e., an amino-containing, azlactone-containing, epoxy-containing, isocyanate-containing, or aziridine-containing vinylic monomer, or combination of two or more such vinylic monomers thereof) either in a lens formulation for making contact lenses or in a polymerizable composition for preparing a silicone-containing vinylic macromer or prepolymer which is in turn used in the lens formulation for making contact lenses. As used herein, the term "reactive" in reference to a vinylic monomer means that the vinylic monomer has an ethylenically-unsaturated group and a reactive functional group selected from the group consisting of amino group, azlactone group, epoxy group, isocyanate group, and aziridine group.

Examples of amino-containing vinylic monomers include without limitation $C_1$-$C_6$ aminoalkyl (meth)acrylate, $C_1$-$C_6$ alkyl-$C_1$-$C_6$ aminoalkyl (meth)acrylate, allylamine, $C_1$-$C_6$ aminoalkyl (meth)acrylamide, $C_1$-$C_6$ alkyl-$C_1$-$C_6$ aminoalkyl (meth)acrylamide, di-$C_1$-$C_6$ aminoalkyl (meth)acrylamide, di-$C_1$-$C_6$ alkyl-$C_1$-$C_6$ aminoalkyl (meth)acrylamide, or combinations thereof.

Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers.

Examples of epoxy-containing vinylic monomers includes without limitation glycidyl (meth)acrylate, ally glycidyl ether, methylallyl glycidyl ether, glycidyl (meth)acrylamide, $C_1$-$C_6$ hydroxyalkyl (meth)acrylate dlycidyl ether (e.g., 4-hydroxypropyl (meth)acrylate glycidyl ether, hydroxypropyl (meth)acrylate glycidyl ether, hydroxylethyl (meth)acrylate glycidyl ether), glycidyl (meth)acrylamide, di-glycidyl (meth)acrylamide, glycidyl ethacrylate, glycidyl itaconate, methylglycidyl (meth)acrylate, 3,4-epoxy-1-vinylcyclohexane, and those disclosed in U.S. Pat. No. 5,677,398 (herein incorporated by reference in its entirety).

Examples of isocyanate-containing vinylic monomers include without limitation isocyanato-$C_1$-$C_6$ alkyl (meth) acrylate.

Examples of aziridine-containing vinylic monomers include without limitation aziridinyl $C_1$-$C_{12}$ alkyl (meth) acrylate (e.g., 2-(1-aziridinyl)ethyl (meth)acrylate, 3-(1-aziridinyl) propyl (meth)acrylate, 4-(1-aziridinyl) butyl (meth)acrylate, 6-(1-aziridinyl) hexyl (meth)acrylate, or 8-(1-aziridinyl) octyl (meth)acrylate), and those aziridinyl vinyl monomers disclosed in U.S. Pat. No. 3,974,131 (herein incorporated by reference in its entirety) (e.g., diethylene glycol mono-(meth)acrylate mono-2-aziridinyl propionate).

A polymerizable composition can be prepared by dissolving all of the desirable components in any suitable solvent known to a person skilled in the art, so long as the used solvent(s) would not react significantly with the azlactone-moiety of the azlactone-containing vinylic monomer or macromer. Example of preferred solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a silicone hydrogel contact lens. Examples of preferred reusable molds are those disclosed in U.S. patent application Ser. No. 08/274,942 filed Jul. 14, 1994, 10/732,566 filed Dec. 10, 2003, 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In a preferred embodiment, a lens formulation for making contact lenses contains a reactive vinylic monomer in an amount of from about 0.05% to about 6.0% by weight, preferably from about 0.2% to about 5% by weight, more preferably from about 0.5% to about 3%, most preferably from about 0.8% to about 2.5% by weight based on the lens formulation, wherein the reactive vinylic monomer is selected from the group consisting of an azlactone-containing vinylic monomer, an epoxy-containing vinylic monomer, an aziridine-containing vinylic monomer, an isocyanate-containing vinylic monomer, and combinations thereof (the reactive vinylic monomer preferably is azlactone-containing vinylic monomer or an epoxy-containing vinylic monomer or both, more preferably is azlactone-containing vinylic monomer). Lenses made from such lens formulation comprise a polymer matrix comprising reactive monomer units each having a reactive functional group selected from the group consisting of azlactone, epoxy, isocyanate, and aziridine groups, preferably consisting of azlactone and epoxy groups.

In accordance with the invention, UV-absorbing moieties can be benzotriazole-moieties, benzophenone-moieties, triazine moieties, or combinations thereof, with benzotriazole-moieties or benzophenone-moieties or both as preferred UV-absorbing moieties, with benzotriazole-moieties as most preferred UV-absorbing moieties.

Any UV-absorbing compounds, which comprises UV-absorbing moieties and a reactive functional group selected from the group consisting of amino group, azlactone group, epoxy group, isocyanate group, aziridine group, and combination thereof, can be used in the invention.

A preferred UV-absorbing compound having a benzotriazole-moiety, which can be used in the invention, is represented by formula I, II, or III

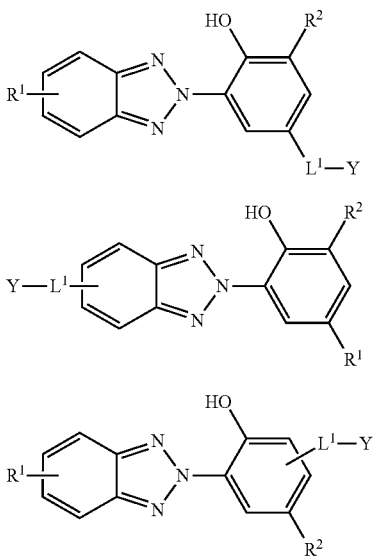

wherein:

$R^1$ and $R^2$ independently of each other are hydrogen, a $C_1$-$C_{12}$ linear or branched alkyl group, a halogen (Cl or Br), a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

$L^1$ is a covalent bond or a divalent radical of —$X_a$-$E_1$-$X_b$-$E_2$-$X_c$— in which $X_a$ is a covalent bond, —O—, carbonyl

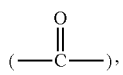

a divalent radical of —$(R^aO)_n$— in which $R^a$ is a linear or branched $C_1$-$C_{12}$-alkylene and n is from 1 to 10,

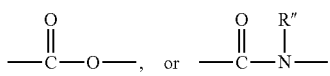

in which R" is H or $C_1$-$C_8$ alkyl, $E_1$ and $E_2$ independently of each other are a covalent bond, a divalent radical of —$(R^aO)_n$— in which $R^a$ and n are defined above,

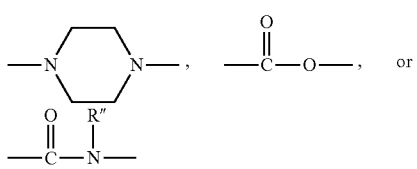

in which R" is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)$L^2$C(O)— in which $L^2$ is a $C_1$ to $C_{12}$ linear or branched alkylene divalent radical or —$(R^{e1}$—O$)_{w1}$—$(R^{e2}$—O$)_{w2}$—$(R^{e3}$—O$)_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (n+m+p) is 1 to 60, and $X_b$ and $X_c$ independently of each other are a covalent bond, carbonyl,

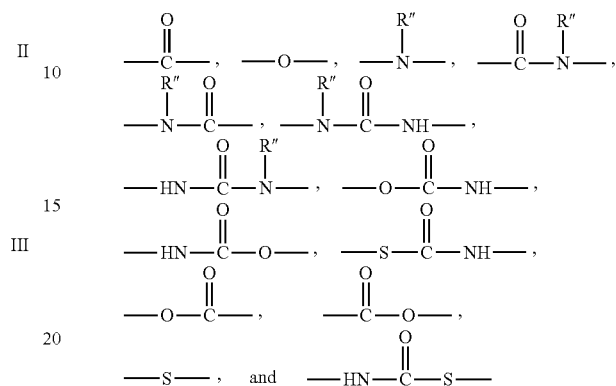

in which R" is defined above; and

Y is an azlactone group, an epoxy group, an isocyanate group, an aziridine group, thiol, or an amino group of —NHR in which R is hydrogen or a $C_1$-$C_{20}$ unsubstituted or substituted, linear or branched alkyl group.

Examples of amino-containing UV-absorbing compounds of formula I, II or III include without limitation 2-(2'-hydroxy-3'-aminomethyl-5'-methylphenyl)-2H-benzotriazole, 2-(2'-hydroxy-5'-aminophenyl)-2H-benzotriazole, 2-(2'-hydroxy-4'-(3-aminopropoxy)phenyl)-2H-benzotriazole, 2-(2'-hydroxy-4'-ethylaminophenyl)-5-chloro-benzotriazole.

Alternatively, amino-containing UV-absorbing compounds of formula I, II, or III can be prepared from a benzotriazole-containing vinyl monomer by reacting its ethylenically-unsaturated group with an aminomercaptan (e.g., 2-aminoethanethiol) according to Michael Addition or thiol-ene reaction well known to a person skilled in the art. Examples of benzotriazole-containing vinylic monomers include without limitation 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole. Benzotriazole-containing vinyl monomers can be prepared according to procedures described in U.S. Pat. Nos. 3,299,173, 4,612,358, 4,716,234, 4,528,311 (herein incorporated by reference in their entireties) or can be obtained from commercial suppliers.

UV-absorbing compounds of formula I, II or III in which Y is an azlactone group, an epoxy group, or an isocyanate group can be prepared from a benzotriazole compound having one hydroxyalkoxy group or an amino group by reacting it with an excess molar equivalent amount of a di-azlactone compound, a di-epoxy compound, or a di-isocyanate compound under customary coupling reaction condition well known to a person skilled in the art.

Examples of di-epoxy compounds are neopentyl glycol diglycidyl ether, 1,6-hexanediol diglycidyl ether, ethylene glycol diglycidyl ether, diethylene glycol diglycidyl ether, polyethylene glycol diglycidyl ether, propylene glycol diglycidyl ether, and dipropylene glycol diglycidyl ether. Such di-epoxy compounds are available commercially (e.g., those DENACOL series di-epoxy compounds from Nagase ChemteX Corporation). Examples of $C_{10}$-$C_{24}$ di-azlactone compounds include those described in U.S. Pat. No. 4,485,236 (herein incorporated by reference in its entirety). Examples of $C_4$-$C_{24}$ diisocyanates can be used in the invention. diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

In formula I, II or III, Y preferably is an azlactone group, thiol, or an amino group of —NHR in which R is hydrogen or a $C_1$-$C_{20}$ unsubstituted or substituted, linear or branched alkyl group, more preferably is an amino group of —NHR with R as defined above.

A preferred UV-absorbing compound having a benzophenone-moiety, which can be used in the invention, is represented by formula IV

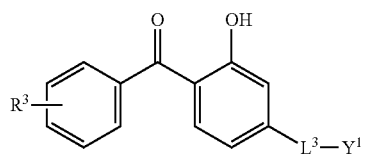

IV in which
R³ is hydrogen, a $C_1$-$C_{12}$ linear or branched alkyl group, a halogen, a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

L³ is a covalent bond or a divalent radical of —$X_a$-$E_1$-$X_b$-$E_2$-$X_c$— in which $X_a$ is a covalent bond, —O—, carbonyl

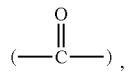

a divalent radical of —($R^aO$)$_n$— in which $R^a$ is a linear or branched $C_1$-$C_{12}$-alkylene and n is from 1 to 10,

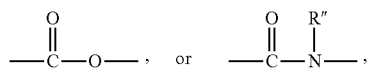

in which R" is H or $C_1$-$C_8$ alkyl, $E_1$ and $E_2$ independently of each other are a covalent bond, a divalent radical of —($R^a$O)$_n$— in which $R^a$ and n are defined above,

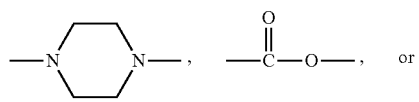

in which R" is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)L²C(O)— in which L² is a $C_1$ to $C_{12}$ linear or branched alkylene divalent radical or —($R^{e1}$—O)$_{w1}$—($R^{e2}$—O)$_{w2}$—($R^{e3}$—O)$_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (n+m+p) is 1 to 60, and $X_b$ and $X_c$ independently of each other are a covalent bond, carbonyl,

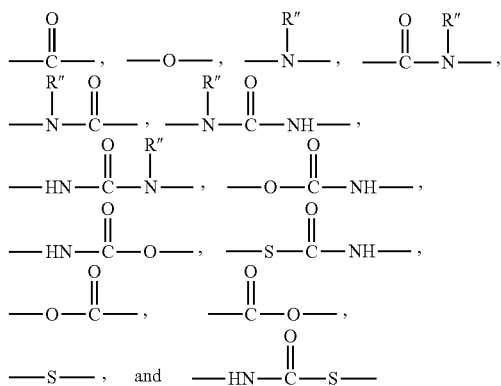

in which R" is defined above; and
Y¹ is an azlactone group, an epoxy group, an isocyanate group, an aziridine group, thiol, or an amino group of —NHR in which R is hydrogen or a $C_1$-$C_{20}$ unsubstituted or substituted, linear or branched alkyl group.

In formula IV, Y¹ preferably is an azlactone group, thiol, or an amino group of —NHR in which R is hydrogen or a $C_1$-$C_{20}$ unsubstituted or substituted, linear or branched alkyl group, more preferably is an amino group of —NHR with R as defined above.

Amino-containing UV-absorbing compounds of formula IV can be prepared from a benzophenone-containing vinyl monomer by reacting its ethylenically-unsaturated group with an aminomercaptan (e.g., 2-aminoethanethiol) according to Michael Addition or thiol-ene reaction well known to a person skilled in the art. Examples of benzophenone-containing vinyl monomers includes without limitation 2-hydroxy-4-acryloxy alkoxy benzophenone, 2-hydroxy-4-methacryloxy alkoxy benzophenone, allyl-2-hydroxybenzophenone, and 2-hydroxy-4-methacryloxy benzophenone. Benzophenone-containing vinyl monomers can be prepared according to procedures described in U.S. Pat. No. 3,162,676 (herein incorporated by reference in its entirety) or can be obtained from commercial suppliers. Resultants amino-containing UV-absorbing compounds of formula IV then can be used directly in the invention or in preparing UV-absorbing compounds of formula IV in which Y¹ is an azlactone group, an epoxy group, or an isocyanate group, by reacting an amino-containing UV-absorbing compounds of formula IV with an excess molar equivalent amount of a di-azlactone compound, a di-epoxy compound, or a di-isocyanate compound under customary coupling reaction condition well known to a person skilled in the art.

A solution of a UV-absorbing compound for treating the contact lens and imparting it with a desired UV-absorbing capability can be prepared by dissolving the UV-absorbing compound in water, a mixture of water and an organic solvent miscible with water, an organic solvent, or a mixture of one or more organic solvent. Preferably, the UV-absorbing compound is dissolved in a mixture of water and one or more organic solvents, an organic solvent, or a mixture of one or more organic solvent. It is believed that a solvent system containing at least one organic solvent can swell a silicone hydrogel contact lens so that more reactive functional groups, such as, amino, azlactone, epoxy, isocyanate, or aziridine groups or combination thereof, in the silicone hydrogel contact lens may be more accessible to the co-reactive groups of the UV-absorbing compound for its effective incorporation in the contact lens. Any organic solvents, including methanol, ethanol, and others described above, can be used in preparation of a solution of a UV-absorbing compound.

In a preferred embodiment, the polymer matrix of a contact to be treated comprises azlactone, epoxy, isocyanate, or aziridine groups or combination thereof, preferably azlactone, epoxy or aziridine groups or combinations thereof, more preferably azlactone or epoxy groups or combinations thereof, most preferably azlactone groups, while the UV-absorbing compound comprises one or more compounds of formula I, II, III or IV, preferably of formula I, II or III, in which Y and $Y^1$ is an amino group of —NHR in which R is hydrogen or a $C_1$-$C_{20}$ unsubstituted or substituted, linear or branched alkyl group. Preferably in this preferred embodiment, the UV-absorbing compound comprises a compound of formula I, II or III in which Y is amino group of —NHR(R is defined above), $R^1$ and $R^2$ independent of each other is hydrogen, halogen, $C_1$-$C_6$ linear or branched alkoxy, $C_1$-$C_{12}$ linear or branched alkyl (preferably t-butyl), or $C_6$-$C_{15}$ aryl, L is a covalent bond or a divalent radical of —$X_a$-$E_1$-$X_b$-$E_2$-$X_c$— in which $X_a$ is a covalent bond or

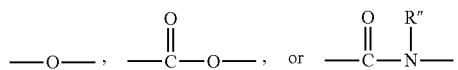

in which R" is H or $C_1$-$C_8$ alkyl, $E_1$ and $E_2$ independently of each other are a covalent bond, a divalent radical of —($R^a$O)$_n$— in which $R^a$ is a linear or branched $C_1$-$C_{12}$-alkylene and n is from 1 to 10, a $C_1$ to $C_{12}$ linear or branched alkylene divalent radical, a cycloalkyl divalent radical with up to 12 carbon atoms, an alkylcycloalkyl divalent radical with up to 20 carbon atoms, an alkylphenyl divalent radical with up to 20 carbon atoms, or an phenylalkylene divalent radical with up to 20 carbon atoms, $X_b$ and $X_c$ independently of each other are a covalent bond, carbonyl,

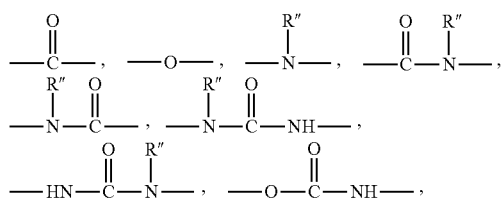

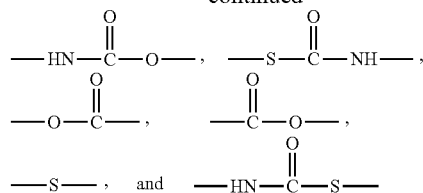

in which R" is defined above; and Y is an amino group of —NHR in which R is hydrogen or a $C_1$-$C_6$ unsubstituted or substituted, linear or branched alkyl group.

Contacting of a contact lens with a solution of a UV-absorbing compound can be carried in any manner known to a person skilled in the art. A preferred contact method is dipping a contact lens in the solution or spraying the contact with the solution, with the former being preferred. The contacting time of a contact lens with a solution of a UV-absorbing compound may last up to about 10 minutes, preferably from about 2 to about 360 seconds. It is understood that, before contacting with a solution of a UV-absorbing compound, a contact lens with reactive functional groups therein and/or thereon can be subjected to extraction with an extraction solvent to remove unpolymerized components from the molded lens, as known by a person skilled in the art. Alternatively, extraction step can be carried out after the UV-absorbing compound is incorporated in the contact lens.

A contact lens obtained according to a method of the invention can further subject to one or more processes selected from the group consisting of lens extraction, hydration, surface treatment, packaging in a lens package contained a packaging solution, sterilization (e.g., by autoclave), and combinations thereof.

The invention, in another aspect, provides a UV-absorbing contact lens made according to a method of the invention described above.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Abbreviations of Reagents:

DCM: Dichloromethane; TEA: Triethyl amine; D-MAP: 4-(Dimethyl amino) pyridine; DCC: N,N-Dicyclohexyl carbodiimide; HMPA: Hexamethylphosphoramide; THF: tetrahydrofuran; AIBN:2-2-Azoiso bisbutyronitrile; NBS: N-Bromosuccinimide; Norbloc: 2-[3-(2H-Benzotriazol-2-yl)-4-hydroxyphenyl]ethyl methacrylate; Tris-Am: N-[tris (trimethylsiloxy)-silylpropyl]acrylamide; DMA: N,N-dimethylacrylamide; DC 1173: Darocur 1173; VDMA: 2-vinyl- 4,4-dimethyl azlactone; MBA: methylenebisacrylamide; DMPC: 1,2-dimyristoyl-sn-glycero-3-phosphocholine; L-PEG: N-(carbonyl-methoxypolyethylene glycol-2000)-1,2-disteaoyl-sn-glycero-3-phosphoethanolamin, sodium salt); 1-PrOH: 1-propanol.

Example 1

This example illustrates the preparation of an amino-functionalized UV-absorbing compound of the invention according to Michael addition as shown in the following Scheme 1.

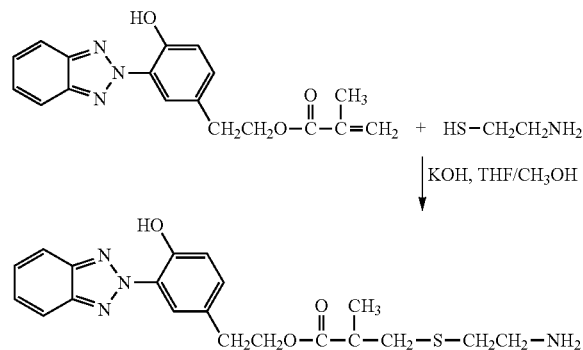

Preparation of Amino-Functionalized Norbloc.

Norbloc is received from Aldrich (Cat #413437-100G). Cysteamine hydrochloride is received from Fluka (Cat #30078). 0.1N iodine aqueous solution is received from Acros (Cat #124220010).

In a 2 liter, three necked round bottom flask, 40.0 g (123.7 mmol) Norbloc is dissolved in 800 mL THF. In a separate flask, 15.46 g (136.1 mmol) of cysteamine hydrochloride is dissolve in 25 mL of methanol. Using an addition funnel, cysteamine HCl solution is added drop wise to reaction flask with stirring. Reaction mixture is purged under nitrogen during reaction time. Once addition is complete, reaction mixture is heated to 35° C. When reaction mixture reaches desired temperature, 0.25 mL of sample from the reaction mixture is withdrawn by syringe. Sample is placed in a 10 mL flask and diluted with 5 mL of 50/50 isopropanol/toluene, acidified with dilute acetic acid and then titrated with 0.1N iodine aqueous solution to determine starting thiol content of reaction. Using addition funnel, 85 mL of 2N potassium hydroxide solution is added to reaction mixture to make it basic. Reaction mixture is allowed to mix at 35° C. under nitrogen. Progress of reaction is monitored by repeating iodine titrations to determine when all of the available thiol has been consumed. Reaction may take up to 65 hours for complete thiol consumption. Once thiol consumption is complete, reaction mixture is cooled to room temperature and transferred to 4 liter reparatory funnel. 400 mL of THF is added to the funnel. Reaction mixture is extracted with 1 L of brine for 2 times. Aqueous phase is discarded and organic phase is dried over magnesium sulfate. Solution is filtered and solvent is removed on a rotary evaporator. Resulting product is a clear, viscous, fluorescent-yellow liquid. Yield of the reaction is about 54.0 grams (90%).

Characterization

Amino-functionalized Norbloc (the product) is characterized by $^1$H-NMR; comparison of spectra between product and starting material shows the disappearance of the methacrylate protons at 5.5 and 6.1 ppm. Functionality of product is also determined by amino-group titration; results show amino-functionality at 2.21 meq/g (theoretical 2.5 meq/g). Purity of product is also determined by HPLC analysis; amino-functionalized Norbloc has shorter retention time than that of the methacrylate starting material, Norbloc, at a detection wavelength of 335 nm. Typical purity of product, by HPLC analysis, is between 85-95% amino-functional material, with the Norbloc (starting material) as the major impurity.

UV spectra of Norbloc and amine functionalized Norbloc show that Michael Addition reaction does not affect significantly the UV-absorption characteristic of Norbloc.

A repeat synthesis is conducted to display reproducibility of the synthesis along with a slight scale-up. The repeat product is confirmed as identical to the previously synthesized product.

Example 2

This example illustrates the synthesis of a chain-extended polydimethylsiloxane vinylic macromer with terminal methacrylate groups (CE-PDMS Macromer):

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternatively, CE-PDMS can be prepared as follows. 240.43 g of KF-6001 is added into a 1-L reactor equipped with stirring, thermometer, cryostat, dropping funnel, and nitrogen/vacuum inlet adapter, and then dried by application of high vacuum ($2 \times 10^{-2}$ mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

Example 3

This example illustrates a method of invention to incorporate a model compound having amino groups in contact lenses.

Preparation of Lens Formulations.

Lens Formulations are Prepared by Dissolving, in t-amyl alcohol, CE-PDMS macromer prepared in Example 2 and other components as listed in Table 1. Note: All the components described below are added first and allowed to dissolve. VDMA is added to the formulation, rolled for ~1 hr and then cast immediately.

TABLE 1

| Formulation No. | CE-PDMS (%) | Tris-Am (%) | DMA (%) | t-Amyl Alcohol (%) | DC1173 (%) | VDMA (%) | MBA (%) |
|---|---|---|---|---|---|---|---|
| Control | 30.9 | 25.3 | 17.5 | 22.6 | 1.0 | — | 0.2 |
| Test | 30.9 | 25.3 | 17.5 | 22.6 | 1.0 | 2.5 | 0.2 |

Preparation of Lenses.

Female Portions of Polypropylene Lens Molds are Filled with about 75 microliters of a lens formulation prepared as above, and the molds are closed with the male portion of the polypropylene lens molds (base curve molds). Contact lenses are obtained by curing the closed molds for about 5 minutes in a double-sided UV cure box equipped with Phillips lights (40 watt, F405) with the top light intensity of about 3.61 mW/cm$^2$ and a bottom light intensity of about 3.54 mW/cm$^2$.

Incorporation of Model Compound.

The cured lenses (control and test lenses) prepared above are demolded from mold, extracted for 324 seconds in methyl ethyl ketone (MEK), then immersed in DI water for a total of about 180 seconds, and packaged in phosphate buffered saline containing about 1 mg/ml of bismarck brown Y dye (Sigma Catalogue #861111) and autoclaved. After autoclave, the lenses are immersed in about 50 mL of fresh 1-propanol for 10 minutes. Such immersion procedure is repeated once and then left in fresh 1-propanol for 2 days, with agitation, to remove absorbed dye molecules from the lens matrix. The control lenses show very low amounts of residual dye in the lens matrix. The testing lenses clearly show the intense reddish-orange color from the dye. The dye is covalently attached to the lens by reaction of the primary amine group in the dye with the azlactone groups present in the polymer matrix of the lenses.

Example 4

This example illustrates a method of invention to incorporate a UV-absorbing compound prepared in Example 1 in contact lenses.

Preparation of Lens Formulations.

Lens formulations are prepared by dissolving, in 1-PrOH, CE-PDMS macromer prepared in Example 2 and other components as listed in Table 2. The concentrations shown in Table 2 are percentage by weight.

Note: All the components described below are added first and allowed to dissolve. VDMA is added to the formulation, rolled for ~1 hr and then cast immediately. Glycidyl (meth)acrylate can be a substitute for VDMA to introduce epoxy groups into the polymer matrix of a silicone hydrogel contact lens for later incorporation of amino-functionalized Norbloc.

TABLE 2

| | Lens Formulation | | | |
|---|---|---|---|---|
| | Control A | I | II | III |
| CE-PDMS | 30.9 | 30.9 | 31.5 | 31.5 |
| Tris-Am | 25.3 | 25.3 | 20.5 | 20.5 |
| DMA | 17.5 | 17.5 | 23.0 | 23.0 |
| MBA | 0.2 | 0.2 | | |
| CuP | | | 0.1 | 0.1 |
| L-PEG | | | 0.5 | 0.5 |
| VDMA | | 2.5 | 0.75 | 0.75 |
| DC 1173 | 1.0 | 1.0 | 1.0 | 1.0 |
| 1-PrOH | | | 22.6 | 22.6 |
| t-Amyl alcohol | 22.6 | 22.6 | | |

Preparation of Lenses.

Female Portions of Polypropylene Lens Molds are Filled with about 75 microliters of a lens formulation prepared as above, and the molds are closed with the male portion of the polypropylene lens molds (base curve molds). Contact lenses are obtained by curing the closed molds for about 5 minutes in a double-sided UV cure box equipped with Phillips lights (40 watt, F405) with the top light intensity of about 3.61 mW/cm$^2$ and a bottom light intensity of about 3.54 mW/cm$^2$.

Alternatively, lenses are prepared by cast-molding from a lens formulation prepared as above in a reusable mold, similar to the mold shown in FIGS. 1-6 in U.S. Pat. Nos. 7,384,590 and 7,387,759 (FIGS. 1-6). The mold comprises a female mold half made of CaF$_2$ and a male mold half made of PMMA. The UV irradiation source is a Hamamatsu lamp with a 328 nm-cut-off filter at an intensity of about 16 mW/cm$^2$. The lens formulation in the mold is irradiated with UV irradiation for about 30 seconds.

The cured lenses (control A and test lenses I, II and III) prepared above are demolded from molds. The demolded lenses are consecutively dipped in a series of baths as shown in Table 3. Amino-functionalized Norbloc, Norbloc-NH$_2$ (prepared in Example 1) in MEK was used to incorporate UV-absorber. Then, the lenses are packaged either in phosphate buffered saline (PBS) or in phosphate buffered saline containing about 0.25% by weight of a polymeric material which is reaction product of Kymene VSP33PL (polyamidoamine-epichlorohydrin) and poly(acrylamide-co-acrylic acid) (90:10). The lenses of formulation II are packaged in phosphate buffer saline and the lenses of formulation III are packaged in phosphate buffer saline with polymeric materials.

TABLE 3

| Lenses I | Time (s) | Lenses II | Time (s) | Lenses III | Time (s) |
|---|---|---|---|---|---|
| Water | 56 | Water | 56 | Water | 56 |
| MEK | 135 | MEK | 45 | MEK | 45 |
| MEK | 135 | MEK | 56 | MEK | 56 |
| 3% Norbloc-NH$_2$ in MEK | 112 | 1.25% Norbloc-NH$_2$ in MEK | 56 | MEK | 56 |
| Water | 56 | Buffer pH 9.0 @ 40° C. | 112 | MEK | 56 |
| MEK | 56 | MEK | 56 | MEK | 56 |
| MEK | 56 | MEK | 56 | MEK | 56 |
| MEK | 56 | Water | 56 | 1.25% Norbloc-NH$_2$ in MEK | 56 |
| MEK | 56 | PAA - 90% | 22 | Water @ RT | 45 |
| Water | 56 | PAA -100% | 78 | Water @ RT | 56 |
| Water | 56 | Water | 56 | Water | 56 |
| PBS | 900 | 1-PrOH | 45 | PAA in 1-PrOH | 45 |
| After Autoclave 1-PrOH | 1 h | 1-Propanol | 56 | PAA in 1-Propanol | 56 |

TABLE 3-continued

| Lenses I | Time (s) | Lenses II | Time (s) | Lenses III | Time (s) |
|---|---|---|---|---|---|
| 1-PrOH | 1 h | Water | 56 | Water | 56 |
| 1-PrOH | 1 h | Water | 56 | Water | 56 |
| 1-PrOH | 12 h | Water | 56 | Water | 56 |
| PBS | 900 | PBS | 900 | PBS | 900 |

UV absorbance is calculated using the following equations:

$$\text{Luminescence \% } T = \text{Average \% Transmission between 780-380 nm}$$

$$UVA \text{ \% } T = \frac{\text{Average \% Transmission between 380-316 nm}}{\text{Luminescence \% } T} \times 100$$

$$UVB \text{ \% } T = \frac{\text{Average \% Transmission between 315-280 nm}}{\text{Luminescence \% } T} \times 100$$

To confirm covalent attachment of amino-functionalized hydroxy phenyl triazole to the bulk, after autoclave several lenses of formulation I are extracted with 2-PrOH by immersing the lenses in three 2-PrOH bath each for about one hour and then immersing in 2-PrOH overnight. Next, lenses are placed in PBS for equilibrium then the lenses are evaluated for UV absorbance. Lenses are manually placed into a specially fabricated sample holder which maintains the shape of the lens as it would be when placing onto eye. This holder is then submerged into a 1 cm path-length quartz cell containing PBS as the reference. The instrument used for this analysis is a Varian Cary 3E UV-Visible Spectrophotometer equipped with a LabSphere DRA-CA-302 beam splitter. Percent transmission spectra were collected at a wavelength range of 250-800 nm with % T values collected at 0.5 nm intervals. This data is transposed onto an Excel spreadsheet and used to determine if the lenses conform to Class 1 UV absorbance. UV-absorption spectra show negligible decrease in UV absorbance after extraction.

Cross-sections of the lenses of formulation II show no internal stress that is common for the lenses of UV blocker introduced in monomer formulation.

The lenses of formulation II and III in both packaging solutions provided Class I UVA/UVB lenses.

After autoclave, the UV-absorbing properties of the lenses are determined as described above. A total of six lenses are measured for % transmittance. Results are reported in Table 4 and indicate that all lenses measured for this experiment meet the ISO guidelines for Class 1 UVA/UVB lenses.

| Lens Formulation | LUM % T | UVA % T | UVB % T |
|---|---|---|---|
| I | 95.06 | 1.61 | 0.21 |
| II | 95.85 | 8.24 | 0.31 |
| III in PBS | 97.53 | 7.18 | 0.19 |
| III in PBS with polymeric material | 97.52 | 7.43 | 0.22 |

A series of experiments are carried out with various combinations of % VDMA in the lens formulation, amino-functionalized hydroxy phenyl triazole concentration in the MEK dip solution and dip sequence designs. It is found that at least 0.75% by weight of VDMA in the lens formulation and 1.00% by weight of amino-functionalized hydroxy phenyl triazole in the dip solution are necessary to achieve Class 1 UVA/B absorber lens. UV absorber dip needs to be a minimum of 56 s and it needs to be followed by an aqueous dip of 112 s or more at room temperature. The UV calculations show that lenses treated with a water dip after the UV absorber dip meet Class 1 parameters for a UV absorbing lens, while the lenses treated with MEK following the UV absorber dip fail to meet Class 1 or Class 2 (UVA % T<50%, UVB % T<5%) specifications.

Example 5

This example illustrates a method of invention to incorporate a UV-absorbing compound prepared in Example 1 in contact lenses.

Synthesis of 80%-Ethylenically Functionalized Polysiloxane

KF-6001 ($\alpha,\omega$-bis(2-hydroxyethoxypropyl)-polydimethylsiloxane, Mn=2000, from Shin-Etsu) and KF-6002 ($\alpha,\omega$-bis(2-hydroxyethoxypropyl)-polydimethylsiloxane, Mn=3000, from Shin-Etsu) are dried at about 55° C. for at least 2 hours (preferably about 12 hours) under high vacuum in a 500 mL jacketed three-neck flask (reactor) with overhead stirring, clean condenser with outlet for vacuum/nitrogen ballon, septum, thermometer, and manifold.

The OH molar equivalent weights of KF-6001 and KF-6002 are determined by titration of hydroxyl groups and are used to calculate the milimolar equivalent to be used in the synthesis.

About 150 milimolar equivalent (mEq) of fresh distilled isophorone diisocyanate (IPDI) is added into a reactor containing about 75 mEq of the dried KF-6001 at about 55° C. with moderate stirring (300 rpm) until the IPDI is fully dissolved. The reactor is purged with nitrogen and heated to 45° C. with stirring and then about 100 microliter of dibutyltin dilaurate (DBTL) is added by using an Eppendorf. The reactor is sealed, and a positive flow of nitrogen is maintained. (exoterms to 90° C. is typically noted). An exotherm occurs, after which the reaction mixture is allowed to cool and stirred at a jacket temperature of about 55° C. for about 2 hours. Forming IPDI-PDMS-IPDI. The completion of reaction is confirmed by isocyanate titration of a sample of reaction mixture. About 150 mEq of KF-6002 is charged into the reactor containing IPDI-PDMS-IPDI. The reaction mixture may become hazy. About 100 microliter of DBTDL is added with Eppendorf. The reaction mixture is stirred overnight under nitrogen at about 55° C. The reaction mixture typically clarifies overnight. Disconnect the heating loop and open the reactor to ambient atmosphere. Increase agitation to ca. 500 rpm to incorporate air into the solution (lots of bubbles). Charge about 120 mEq of isocyantoethyl methacrylate (IEM) to the reactor together with about 100 microliter of DBTDL. Allow the reaction to process overnight, or followed by titration. Volatiles are removed by rotary evaporation with slight air-purge. Resultant reaction product (80%-ethylenically functionalized PDMS or 80%-IEM capped PDMS) is filtered with filter (5.0 micrometer exclusion) and ready for use.

Synthesis of Prepolymer

A 1-L jacketed reactor is equipped with 500-mL addition funnel, overhead stirring, reflux condenser with nitrogen/vacuum inlet adapter, thermometer, and sampling adapter. 45.6 g of 80%-IEM capped PDMS obtained according to the procedures described in Example 2 is charged to the reactor and the reactor is sealed. A solution of 0.65 g of HEMA, 25.80 g of DMA, 27.80 g of TRIS in 279 g of ethyl acetate is charged to the addition funnel. The reactor is degassed at <1 mbar for 30 minutes at RT with a high-vacuum pump. The monomer solution is degassed at 100 mbar and RT for 10 minutes for three cycles, breaking vacuum with nitrogen between degas cycles. The monomer solution is then charged to the reactor, and then the reaction mixture is stirred and heated to 67° C.

While heating a solution of 1.50 g of mercaptoethanol (chain transfer agent, CTA) and 0.26 g of azoisobutyronitrile dissolved in 39 g of ethyl acetate is charged to the addition funnel and deoxygenated three times at 100 mbar, RT for 10 minutes. When the reactor reaches 67° C., the initiator/CTA solution is added to the PDMS/monomer solution. The reaction is allowed to proceed for 8 hours, and then heating is discontinued and reactor temperature is brought to room temperature within 15 min.

The above reaction mixture is siphoned to a dry single-neck flask with airtight lid, and 4.452 g of IEM is added with 0.21 g of dibutyltin dilaurate. The mixture is stirred 24 hs at room temperature. 100 uL of hydroxy-tetramethylene piperonyloxy solution in ethyl acetate (2 g/20 mL) is added to the reaction solution before the solution is concentrated to 200 g (~50%) and filtered through 1 um pore size filter paper. The solvent is then exchanged to 1-propanol by adding 100 g of 1-propanol to the reaction solution and pulling off 100 g of solvent via rotavap at 30° C. The process is complete after three cycles. The solid content is measured via removing the solvent at vacuum oven at 80° C.

Preparation of Lens Formulations.

Lens formulations are prepared by dissolving, in 1-PrOH, prepolymer prepared above and other components as listed in Table 4. Note: All the components described below are added first and allowed to dissolve. VDMA is added to the formulation, rolled for ~1 hr and then cast immediately. Glycidyl (meth)acrylate can be a substitute for VDMA to introduce epoxy groups into the polymer matrix of a silicone hydrogel contact lens for later incorporation of amino-functionalized hydroxy phenyl triazole.

TABLE 4

|  | Prepolymer | DMA | VDMA | DC1173 | DMPC | 1-PrOH |
|---|---|---|---|---|---|---|
| Control B | 71 | 4 |  | 1 | 0.75 | 23.25 |
| IV | 71 | 4 | 0.75 | 1 | 0.75 | 22.5 |

Lenses are prepared by cast-molding from a lens formulation prepared in a polypropylene molds and cured under UV as explained above in Example 4.

The cured lenses (control B and test lenses III) prepared above are demolded from molds. The demolded lenses are consecutively dipped in a series of baths as following: one water bath for about 56 s; MEK baths (6 baths, the dipping times are about 45, 56, 56, 56, 56 and 56 seconds respectively), 1% of amino-functionalized hydroxy phenyl triazole (prepared in Example 1) in MEK for about 56 s; three water baths at room temperature for about 45 s, about 56 s and about 56 s respectively; two baths containing 0.36% of polyacrylic acid (PAA) in 1-PrOH for about 44 s and about 56 s respectively; three water baths each for about 56 s respectively. Then, the lenses are packaged either in phosphate buffered saline (PBS) or in phosphate buffered saline containing about 0.25% by weight of a polymeric material which is reaction product of Kymene VSP33PL (polyamidoamine epichlorohydrin) and poly(acrylamide-co-acrylic acid) 90:10.

After autoclave, the UV-absorbing properties of the lenses are determined. Results are reported in Table 5. The control lenses show very low amounts of UV absorption in UV/Vis absorption spectrum, while the testing lenses clearly show the intense UV absorption in UV/Vis absorption spectrum. Class I UVA/B absorber lenses are achieved for both sets of lenses which are packaged in PBS and PBS with polymeric materials shown in table 5. Along with the UV-V is measurements, both groups of the lenses with the controls are tested for modulus, IP relative to Alsacon lens material and $Dk_c$ (estimated intrinsic Dk or Dk corrected for the surface resistance to oxygen flux caused by the boundary layer effect) and data are shown in the Table 6. Lenses of formulation IV show higher IP than control lenses. UV absorber in the lens does not affect Dk, or modulus/Etb (elongation to break).

Lenses of formulation IV packaged in PBS with polymeric materials show much lower Dk and Etb. These effects need to be investigated by coating group.

TABLE 5

| Lens Formulation | LUM % T | UVA % T | UVB % T |
|---|---|---|---|
| IV in PBS | 94.82 | 9.64 | 0.67 |
| IV in PBS with polymeric material | 94.48 | 9.26 | 0.63 |

TABLE 6

| Lenses | Package Solutions | Lens Properties ||||
|---|---|---|---|---|---|
|  |  | IP | $Dk_c$ | E modulus | Etb |
| Control B | PBS | 3.8 | 215 | 0.51 | 694 |
| Control B | PBS with polymers | 3.8 | 104 | 0.52 | 432 |
| Lenses IV | PBS | 6.1 | 209 | 0.51 | 646 |
| Lenses IV | PBS with polymers | 6.5 | 111 | 0.51 | 226 |

Oxygen Permeability Measurements.

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters O$_2$/cm$^2$-minute]
$P_{oxygen}$=($P_{measured}$−$P_{water}$ vapor)=(% O$_2$ in air stream)
[mm Hg]=partial pressure of oxygen in the air stream
$P_{measured}$=barometric pressure (mm Hg)
$P_{water}$ vapor=0 mm Hg at 34° C. (in a dry cell) (mm Hg)

$P_{water}$ vapor=40 mm Hg at 34° C. (in a wet cell) (mm Hg)
t=average thickness of the lens over the exposed test area (mm)
$Dk_{app}$ is expressed in units of barrers.

The oxygen transmissibility (Dk/t) of the material may be calculated by dividing the oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptix™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 µm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum \left( \frac{t}{Dk_{app}} - \frac{t}{Dk_i} \right)}{n} \quad (1)$$

In which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j=(\Delta P/K)_j$ and $X=t_j$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c=t/[(t/Dk_a)-R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 µm. The standard thickness for lotrafilcon B=60 µm.

$$Dk_{a\_std}=t_{std}/[(t_{std}/Dk_c)+R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

What is claimed:

1. A method for producing UV-absorbing contact lenses, comprising the steps of:
   (1) obtaining a contact lens including a polymer matrix comprising reactive vinylic monomer units each having a first reactive functional group which is azlactone group, epoxy group, isocyanate group, aziridine group, or combination thereof, wherein the contact lens is obtained by polymerizing in a mold a lens formulation comprising a reactive vinylic monomer selected from the group consisting of an azlactone-containing vinylic monomer, an epoxy-containing vinylic monomer, an isocyanate-containing vinylic monomer, an aziridine-containing vinylic monomer, and a combination thereof;
   (2) obtaining a solution containing a UV-absorbing compound having a UV-absorbing moiety and an amino group of —NHR in which R is hydrogen or a $C_1$-$C_{20}$ unsubstituted or substituted, linear or branched alkyl group; and
   (3) covalently attaching UV-absorbing moieties to the polymer matrix of the contact lens through covalent linkages each formed in a reaction between the amino group of the UV-absorbing compound and one of the first reactive functional groups of the reactive vinylic monomer units of the polymer matrix, by contacting the contact lens with the solution of the UV-absorbing compound.

2. The method of claim 1, wherein the UV-absorbing moieties are benzotriazole-moieties, benzophenone-moieties, or combinations thereof.

3. The method of claim 1, wherein the UV-absorbing compound in step (2) comprises a compound of formula I, II, III, or IV

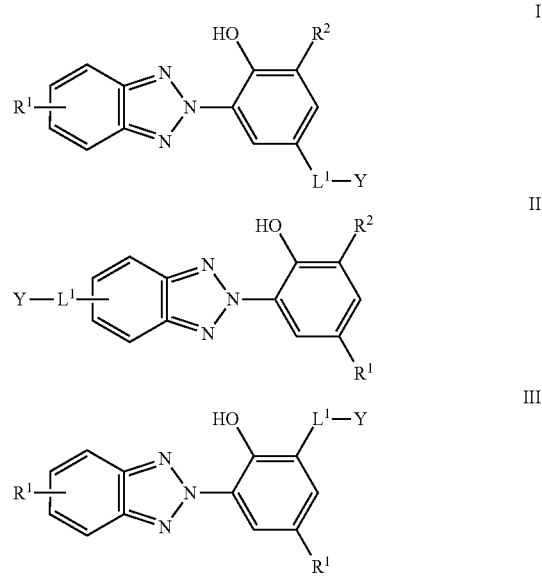

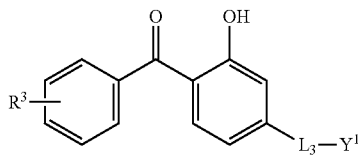

in which
R$^1$, R$^2$ and R$^3$ independently of one other are hydrogen, a C$_1$-C$_{12}$ linear or branched alkyl group, a halogen which is Cl or Br, a C$_6$ to C$_{24}$ aryl group, a C$_7$ to C$_{24}$ alkylaryl group, a C$_7$ to C$_{24}$ arylalkyl, or a C$_1$-C$_{12}$ linear or branched alkoxy group;

L$^1$ and L$^3$ independent of each other are a covalent bond or a divalent radical of —X$_a$-E$_1$-X$_b$-E$_2$-X$_c$— in which X$_a$ is a covalent bond, —O—, carbonyl

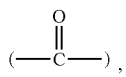

a divalent radical of —(R$^a$O)$_n$— in which R$^a$ is a linear or branched C$_1$-C$_{12}$-alkylene and n is from 1 to 10,

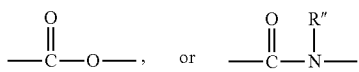

in which R" is H or C$_1$-C$_8$ alkyl, E$_1$ and E$_2$ independently of each other are a covalent bond, a divalent radical of —(R$^a$O)$_n$— in which R$^a$ and n are defined above,

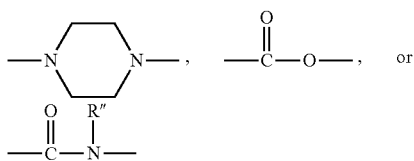

in which R" is H or C$_1$-C$_8$ alkyl, a C$_1$ to C$_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)L$^2$C(O)— in which L$^2$ is a C$_1$ to C$_{12}$ linear or branched alkylene divalent radical or —(R$^{e1}$—O)$_{w1}$—(R$^{e2}$—O)$_{w2}$—(R$^{e3}$—O)$_{w3}$—, wherein R$^{e1}$, R$^{e2}$, and R$^{e3}$ independently of one another are a linear or branched C$_1$-C$_4$-alkylene and w1, w2 and w3 independently of one another are a number from 0 to 20 provided that the sum of (n+m+p) is 1 to 60, and X$_b$ and X$_c$ independently of each other are a covalent bond, carbonyl,

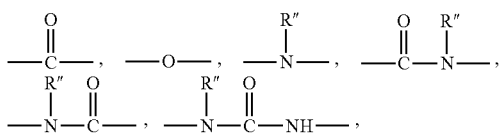

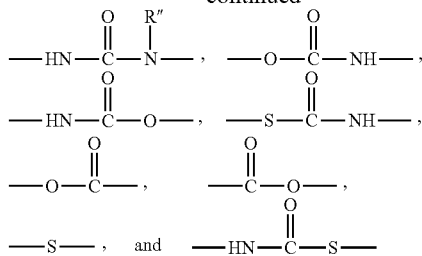

in which R" is defined above; and
Y and Y$^1$ independent of each other are an amino group of —NHR in which R is hydrogen or a C$_1$-C$_{20}$ unsubstituted or substituted, linear or branched alkyl group.

4. The method of claim 1, wherein the reactive vinylic monomer is present in the lens formulation in an amount of from about 0.05% to about 6.0% by weight, based on the lens formulation.

5. The method according to claim 1, wherein the UV-absorbing compound comprises a compound of formula I, II or III in which Y is amino group of —NHR in which R is hydrogen or a C$_1$-C$_{20}$ unsubstituted or substituted, linear or branched alkyl group, R$^1$ and R$^2$ independent of each other is hydrogen, halogen, C$_1$-C$_6$ linear or branched alkoxy, C$_1$-C$_{12}$ linear or branched alkyl, or C$_6$-C$_{15}$ aryl, L is a covalent bond or a divalent radical of —X$_a$-E$_1$-X$_b$-E$_2$-X$_c$— in which X$_a$ is a covalent bond or

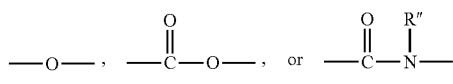

in which R" is H or C$_1$-C$_8$ alkyl, E$_1$ and E$_2$ independently of each other are a covalent bond, a divalent radical of —(R$^a$O)$_n$— in which R$^a$ is a linear or branched C$_1$-C$_{12}$-alkylene and n is from 1 to 10, a C$_1$ to C$_{12}$ linear or branched alkylene divalent radical, a cycloalkyl divalent radical with up to 12 carbon atoms, an alkylcycloalkyl divalent radical with up to 20 carbon atoms, an alkylphenyl divalent radical with up to 20 carbon atoms, or an phenylalkylene divalent radical with up to 20 carbon atoms, X$_b$ and X$_c$ independently of each other are a covalent bond, carbonyl,

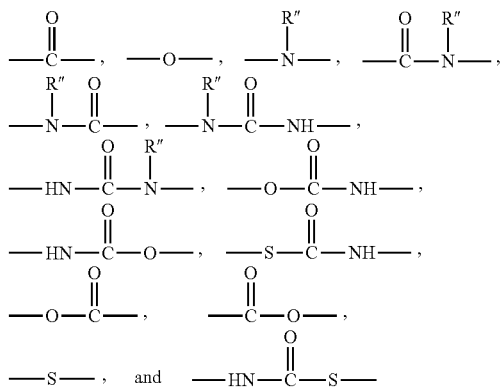

in which R" is defined above; and Y is an amino group of —NHR in which R is hydrogen or a C$_1$-C$_6$ unsubstituted or substituted, linear or branched alkyl group.

6. The method of claim 1, wherein the solution of the UV-absorbing compound is prepared by dissolving the UV-absorbing compound in water, a mixture of water and an organic solvent miscible with water, an organic solvent, or a mixture of one or more organic solvent.

7. The method of claim 5, wherein the solution of the UV-absorbing compound is prepared by dissolving the UV-absorbing compound in water, a mixture of water and an organic solvent miscible with water, an organic solvent, or a mixture of one or more organic solvent.

8. The method according to claim 7, wherein the contact lens is subjected to one or more processes selected from the group consisting of lens extraction, hydration, surface treatment, packaging in a lens package contained a packaging solution, sterilization and combinations thereof.

9. The method according to claim 7, wherein the contact lens is a soft contact lens.

10. The method of claim 9, the soft contact lens is a silicone hydrogel contact lens.

11. A contact lens produced according to a method of claim 3.

* * * * *